United States Patent
Stewart

(10) Patent No.: US 9,719,550 B2
(45) Date of Patent: Aug. 1, 2017

(54) PAWL-AND-RATCHET LOCKABLE THREADED FASTENER ASSEMBLY

(71) Applicants: Robert E. Stewart, Farmington Hills, MI (US); Nicholas Strumbos, Birmingham, MI (US)

(72) Inventor: Robert E. Stewart, Farmington Hills, MI (US)

(73) Assignees: Robert E. Stewart, Farmington Hills, MI (US); Nicholas Strumbos, Birmingham, MI (US)

( * ) Notice: Subject to any disclaimer, the term of this patent is extended or adjusted under 35 U.S.C. 154(b) by 44 days.

(21) Appl. No.: 14/861,002

(22) Filed: Sep. 22, 2015

(65) Prior Publication Data

US 2016/0084291 A1 Mar. 24, 2016

Related U.S. Application Data

(60) Provisional application No. 62/054,349, filed on Sep. 23, 2014.

(51) Int. Cl.
*F16B 39/32* (2006.01)

(52) U.S. Cl.
CPC .................... *F16B 39/32* (2013.01)

(58) Field of Classification Search
CPC ....................................................... F16B 39/32
USPC .................. 411/128, 964, 963, 953, 330, 332
See application file for complete search history.

(56) References Cited

U.S. PATENT DOCUMENTS

| | | | | |
|---|---|---|---|---|
| 15,379 | A * | 7/1856 | Bechberger | B23D 13/005 409/346 |
| 324,347 | A * | 8/1885 | Wynn | F16B 39/10 411/119 |
| 343,743 | A * | 6/1886 | Vanderwerken | F16B 39/10 411/128 |
| 969,397 | A * | 9/1910 | Partridge | F16B 39/10 411/119 |
| 1,150,362 | A * | 8/1915 | Hascall | C09C 1/50 411/198 |
| 1,261,616 | A * | 4/1918 | Reinicker | F16B 39/10 184/48.1 |
| 1,269,059 | A * | 6/1918 | D'Arden | F16B 37/044 411/117 |
| 2,141,701 | A * | 12/1938 | Uherkovich | F16B 39/24 411/245 |
| 3,419,057 | A | 12/1968 | Hogan | |
| 5,606,753 | A * | 3/1997 | Hashimoto | F16B 39/32 411/120 |
| 8,393,839 | B2 | 3/2013 | Savoy et al. | |

* cited by examiner

*Primary Examiner* — Gary Estremsky
(74) *Attorney, Agent, or Firm* — Reising Ethington, P.C.

(57) ABSTRACT

A fastener assembly includes a fastener, a washer, and a ratchet plate. The washer includes a washer base, and at least one pawl extending from the washer base. The ratchet plate includes a ratchet base and a ratcheted outer profile extending in a circumferential direction around a circumferential periphery of the ratchet base. The ratchet plate is carried by a head of the fastener, and the ratcheted outer profile cooperates with the pawl of the washer.

26 Claims, 4 Drawing Sheets

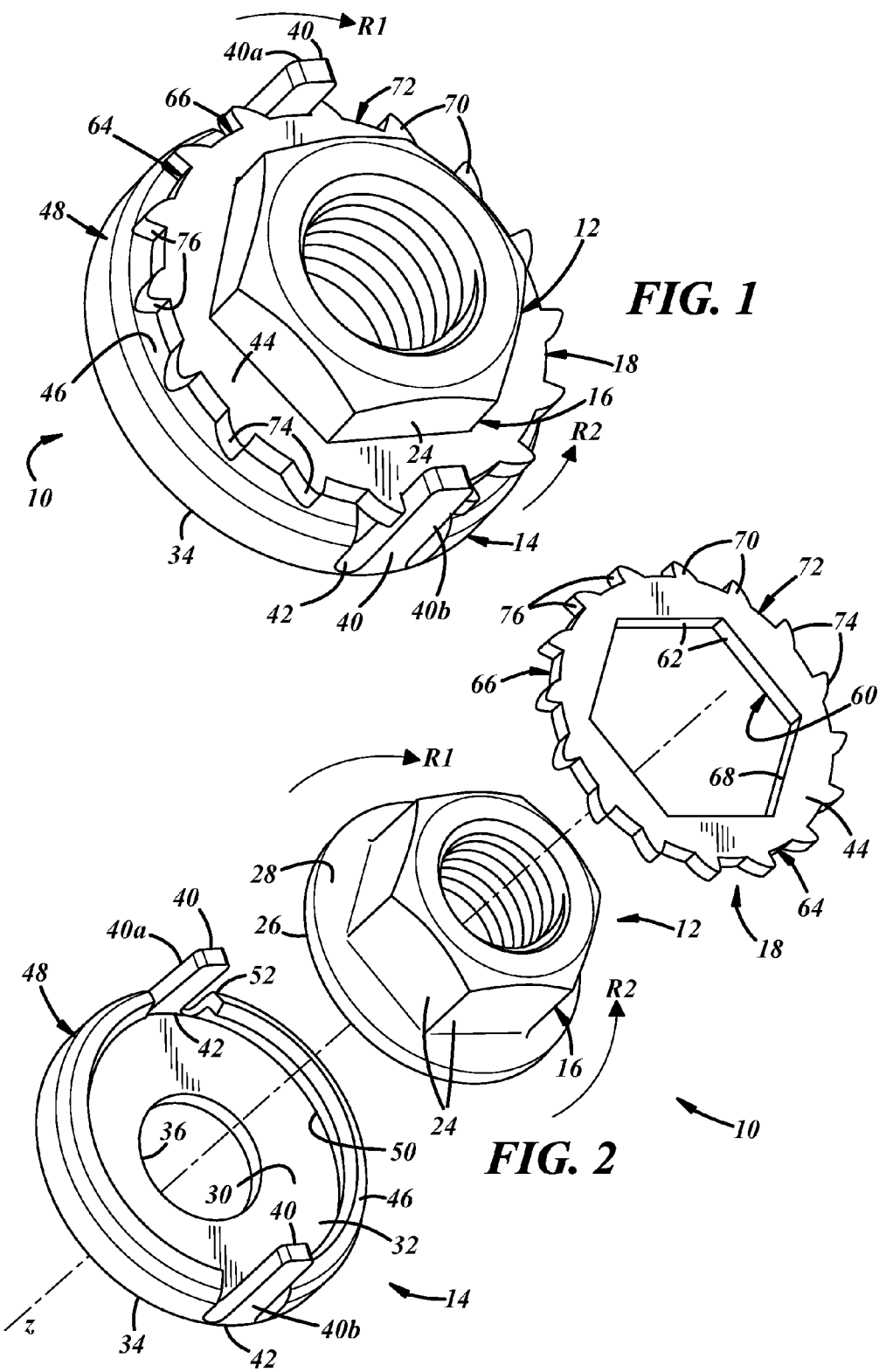

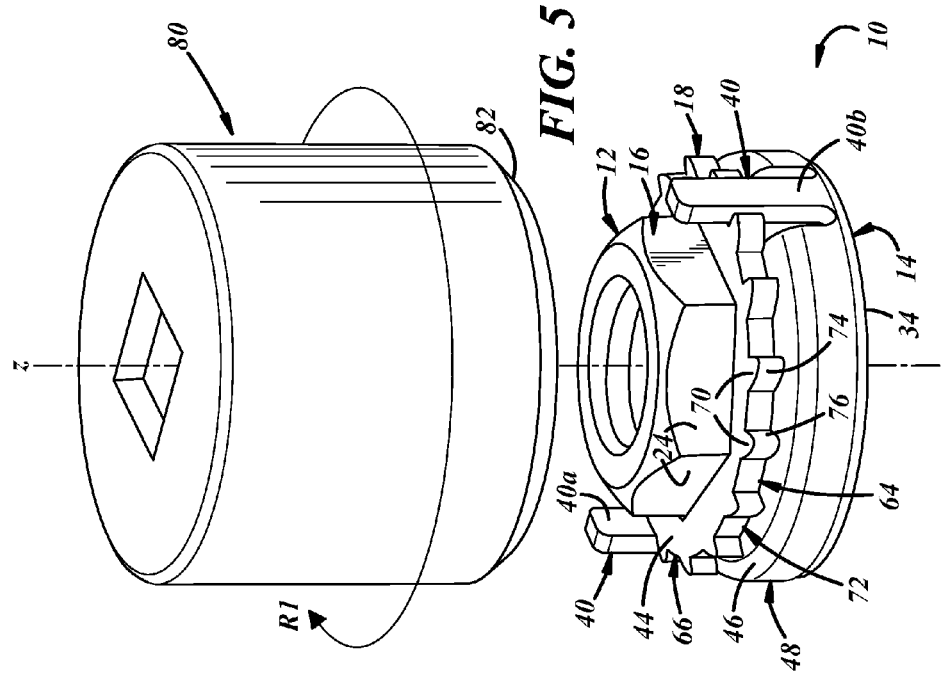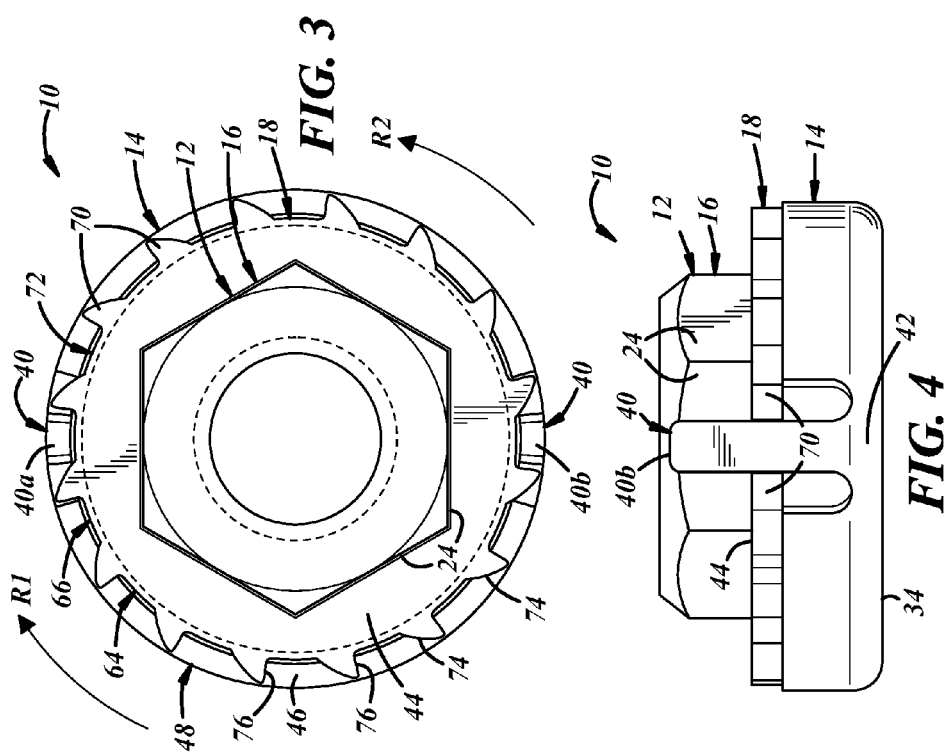

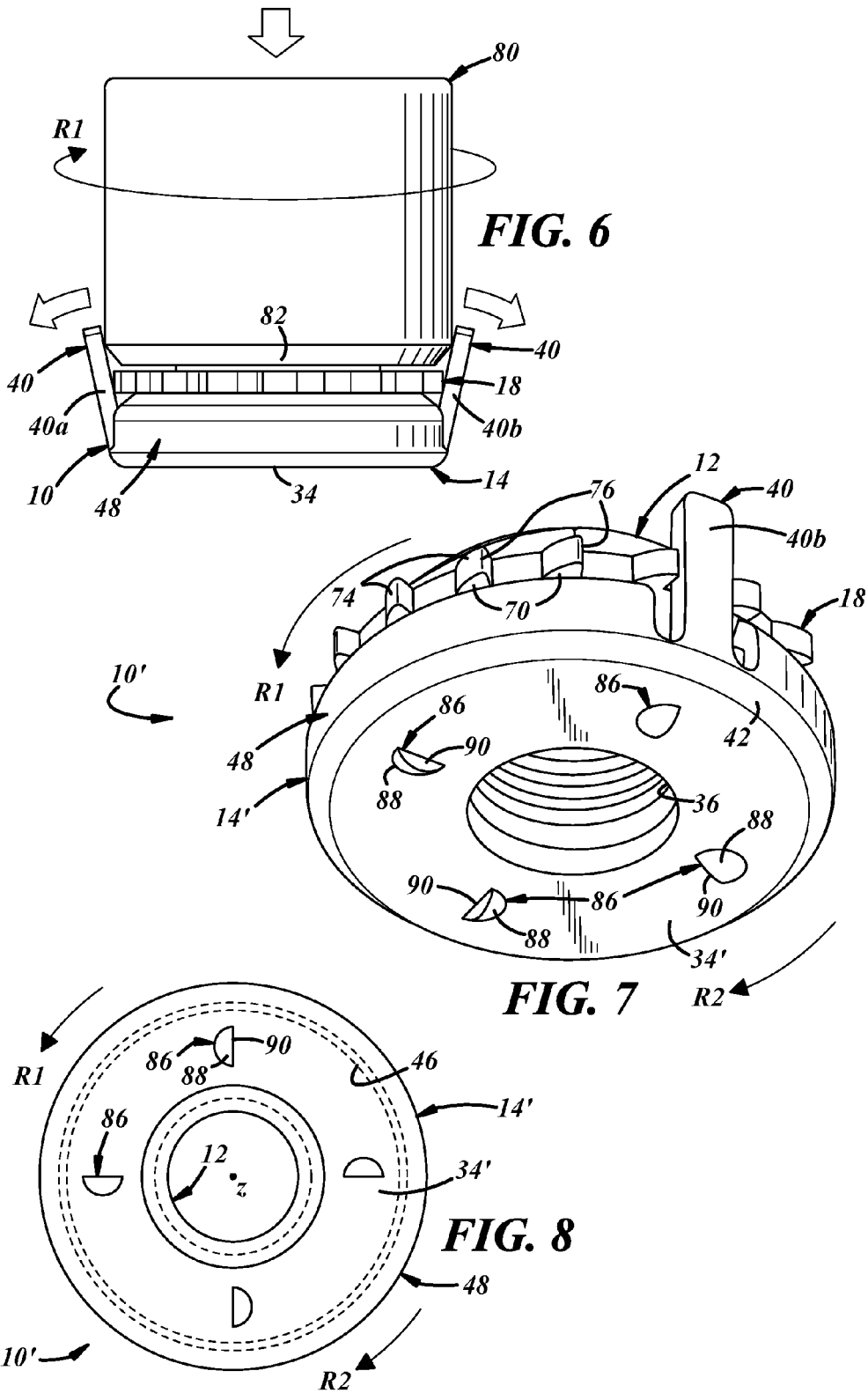

PAWL-AND-RATCHET LOCKABLE THREADED FASTENER ASSEMBLY

TECHNICAL FIELD

The present disclosure is directed to fastener assemblies and, more particularly, to lockable threaded fastener assemblies.

BACKGROUND

Hexagonal head threaded fastener assemblies typically include a nut or a bolt having a hexagonal fastener head, and having a washer adjacently facing the fastener head. Many fastener assembly designs include locking features to lock a fastener against unintended rotation and loosening. But it is relatively difficult to design a robust lockable fastener assembly that abides use of a threaded fastener having a hexagonal head.

SUMMARY

A fastener assembly includes a fastener, a washer, and a ratchet plate. The washer includes a washer base, and at least one pawl extending from the washer base. The ratchet plate includes a ratchet base and a ratcheted outer profile extending in a circumferential direction around a circumferential periphery of the ratchet base. The ratchet plate is carried by a head of the fastener, and the ratcheted outer profile cooperates with the pawl of the washer.

BRIEF DESCRIPTION OF THE DRAWINGS

Features and advantages of one or more of the disclosed embodiments of this disclosure will be apparent to those of ordinary skill in the art from the following detailed description of illustrative embodiments and the claims, with reference to the accompanying drawings in which:

FIG. 1 is a perspective view of a fastener assembly according to a first illustrative embodiment, the fastener assembly including a fastener, a washer, and a ratchet plate in an assembled state;

FIG. 2 is an exploded perspective view of the fastener assembly shown in FIG. 1;

FIG. 3 is a top view of the fastener assembly shown in FIG. 1;

FIG. 4 is a side view of the fastener assembly shown in FIG. 1;

FIG. 5 is a perspective view of the fastener assembly of FIG. 1 and a socket head tool in an unengaged position;

FIG. 6 is a side view of the fastener assembly of FIG. 1 and the socket head tool in an engaged position;

FIG. 7 is a perspective view of a fastener assembly according to a second illustrative embodiment, the fastener assembly including a washer having protuberances on a bottom bearing surface;

FIG. 8 is a bottom view of the fastener assembly shown in FIG. 7;

DETAILED DESCRIPTION

Figure 9:
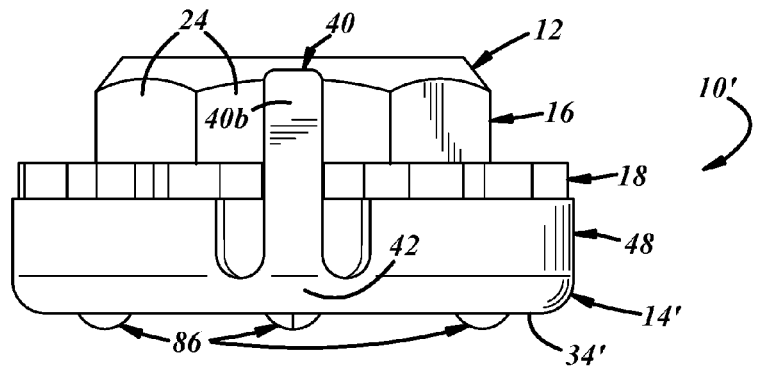
FIG. 9 is a side view of the fastener assembly shown in FIG. 7.

FIGS. 1-4 illustrate a first illustrative embodiment of a hexagonal head fastener assembly 10. The assembly 10 extends along a longitudinal axis Z, and includes a fastener 12 rotatable about the Z-axis, a washer 14 rotatable with respect to a fastener head 16 of the fastener 12, and a ratchet plate 18 carried by the fastener head 16 and non-rotatable with respect to the fastener head 16.

With reference to FIG. 2, the fastener 12 includes the fastener head 16, which may be hexagonal, with side flats 24, and a washer bearing surface 26 extending transversely with respect to the Z-axis. The fastener 12 may include a nut or a bolt. More specifically, the fastener 12 may be a flanged fastener including a flange 28 disposed between the side flats 24 and the washer 14. The fastener 12 may be a standard fastener, for example, one that is a readily available or off-the-shelf fastener that is not custom designed and/or requires no custom forming or machining operations. In a more specific example, the fastener 12 may be a fastener from property class 8, 9, or 10, or for very high tensile fasteners, and either prevailing torque type or free running type nuts can be used without design adjustment.

As also shown in FIG. 2, the washer 14 includes a washer base 30 having a first bearing surface 32 disposed transversely with respect to the Z-axis and in direct contact with the washer bearing surface 26 of the fastener 12, a second bearing surface 34 facing in an opposite direction from the first bearing surface 32, and an aperture 36 extending completely through the washer base 30 between the first and second bearing surfaces 32, 34. The washer 14 may be a stamping or a stamped component.

The washer 14 also includes at least one pawl 40 extending from the washer base 30 in a direction toward the fastener head 16 and at least partially alongside the fastener head 16, and being resiliently flexible in a radially outward direction. The illustrated washer 14 includes two diametrically opposed pawls 40a, 40b, but may include only one pawl or any other suitable quantity of pawls. The washer 14 may include a bend 42 between the washer base 30 and the pawl 40, wherein the pawl 40 otherwise includes no other bends. In one embodiment, the pawl 40 may be straight, extending only in a longitudinal direction, and not bent into compound planes. In other embodiments, the pawl 40 may be bent to facilitate engagement with a tool. Also, the pawl 40 may extend longitudinally past a ratchet base 44 (of ratchet plate 18) and further alongside the fastener head 16.

The washer 14 may be a captive washer carried by the fastener head 16, and axially restrained with respect to the fastener head. Accordingly, the captive washer 14 also may include a rim 46 extending in a circumferential direction around a circumferential periphery 48 of the washer base 30 and in an axial direction from the washer base 30 toward the fastener head 16 and at least partially alongside the fastener head 16 and bent over a portion of the fastener head 16. The illustrated pawl 40 circumferentially interrupts the rim 46, and is longitudinally longer than the rim. The washer 14 may include a bend 50 between the washer base 30 and the rim 46, and wherein the rim 46 includes another bend 52. The rim 46 of the washer 14 may be circular and may not circumferentially lock to the fastener 12 or the ratchet plate 18.

As best shown in FIG. 2, the ratchet plate 18 includes the ratchet base 44, an inner profile 60, which may be hexagonal, to receive the hexagonal head 16 of the fastener 12, and having inner flats 62 corresponding to the side flats 24 of the fastener head 16, and a ratcheted outer profile 64 extending in a circumferential direction around a circumferential periphery 66 of the ratchet base 44 for cooperation with the pawl 40 of the washer 14. The ratchet base 44 may be in direct contact with the rim 46 of the washer 14. More specifically, the ratcheted outer profile 64 may rest against the rim 46. The hexagonal inner profile 60 may be a hexagonal aperture 68, and the ratchet base 44 may rest against the flange 28 of the fastener 12 at the aperture 68 (see also FIGS. 1 and 4). The ratchet plate 18 may be a stamping or a stamped circular disk.

In some implementations, the fastener 12 may be staked to the ratchet plate 18. For example, the side flats 24 may be staked to the ratchet plate 18 as disclosed in U.S. Pat. No. 5,934,851, which is hereby incorporated by reference herein in its entirety. In another example, corners between the side flats 24 may be staked to the ratchet plate 18 as disclosed in U.S. Pat. No. 5,971,686, which is hereby incorporated by reference herein in its entirety. Accordingly, the ratchet plate 18 may be axially trapped between stakings and the fastener head flange 28, or between axially opposed stakings where the fastener head 16 has no flange. In other embodiments, the ratchet plate 18 may be press-fit, welded, brazed, fastened, overmolded, adhered with epoxy, silicone, glue, or other adhesive, or otherwise coupled in any other suitable manner to the fastener 12.

The ratcheted external periphery 66 may be flat. In fact, the entire ratchet plate 18 may be flat, with no upturned or bent edges. Also, as best illustrated in FIG. 2, the ratcheted external periphery 66 may include a plurality of teeth 70, for example, at least four teeth, sixteen teeth as illustrated, or any other suitable quantity of teeth. Further, the ratcheted external periphery 66 may have a round circumferentially extending portion 72 and the plurality of teeth 70 may extend therefrom. The teeth 70 may have asymmetrical profiles and may include cam surfaces 74 facing along a tightening rotational direction R1 and stop shoulders 76 facing along a loosening rotational direction R2.

In operation, the pawl 40 may cooperate with the ratchet plate 18 to allow the fastener 12 to freewheel with respect to the washer 14 in the tightening rotational direction R1 of the fastener 12 but lock with respect to the washer 14 in the loosening rotational direction R2 of the fastener 12. Also, tightening rotation R1 of the fastener 12 and ratchet plate 18 may result in relative rotational movement between the ratchet plate 18 and the pawl 40 such that the ratcheted circumferential periphery 66 of the ratchet plate 18 radially outwardly deflects the pawl 40. Because the pawl 40 is resiliently flexible, the pawl will snap back against the ratchet plate 18 between the teeth 70, thereby producing an audible clicking sound as the fastener 12 rotates. In a rest state (FIG. 1), the pawl 40 will rest between the teeth 70 and rest against a corresponding stop shoulder 76 of a corresponding one of the teeth 70, to prevent or reduce loosening of the fastener 12 under load and/or due to vibration.

Also, as shown in FIGS. 5-6, the longitudinally extending pawl 40 is resiliently displaceable in a radially outward direction out of engagement with the ratchet plate 18. For example, a tool 80, such as a hex socket head tool, may couple to the fastener head 16 and may have a chamfered end 82 and an outer diameter sufficiently sized to force the pawl 40 out of detent between the ratchet teeth 70 during rundown or tightening of the fastener 12 (FIG. 6). Accordingly, the fastener 12 may be tightened without causing the clicking sound of the pawl 40 snapping against the ratchet plate 18.

In general, the components of the fastener assembly 10 can be manufactured according to techniques known to those skilled in the art, including machining, stamping or other forming, and/or the like. Also, the fastener assembly 10 can be assembled according to known techniques, manual or automatic. Likewise, any suitable materials can be used in making the components, such as metals, composites, polymeric materials, and the like. In one example, the washer 14 may be manufactured from high carbon steel capable of being heat treated to a hardness of Rockwell "C" of 26 at a minimum to assure that the pawl 40 will return to its original position after each tooth indexes, thereby assuring a secure lock. For instance, the washer 14 may be composed of SAE 1050 steel and hardened to a hardness of Rc 39 to 43 including all ranges and subranges therebetween. In another example, the ratchet plate 18 can be composed of low carbon steel or high carbon steel. The hardened pawl 40 may degrade the ratchet teeth 70 slightly but they should have enough yield and tensile strength to secure the fastener 12. For higher torque fasteners or extreme environments (e.g., high vibration, etc.) the ratchet plate 18 may be composed of a high carbon steel and heat-treated to a hardness of Rockwell "C" 26 minimum for extra strength. For light duty applications, the ratchet plate 18 may be composed of a nylon or other tough plastic.

FIGS. 7-9 illustrate a second illustrative embodiment of a fastener assembly 10'. In this regard, all of the figures include many illustrative embodiments of fastener assemblies and components for fastener assemblies. These embodiments are similar in many respects to one another and the individual features of the embodiments are usable with one another and each and every one of the described and/or illustrated embodiments are hereby incorporated into one another. Hereafter, like numerals represent similar elements or elements having like or similar functionality.

A second bearing surface 34' of a washer 14' may include a plurality of protuberances 86 extending longitudinally therefrom. More specifically, the protuberances 86 may be D-shaped when viewed along the longitudinal Z-axis. For example, the protuberances 86 may include semicircular or partially hemispherical sides 88 facing along the tightening rotational direction R1 and smoothly blending into the second bearing surface 34', and straight or flat sides 90 facing along the loosening rotational direction R2 and abruptly projecting from the second bearing surface 34'.

Figure 10:
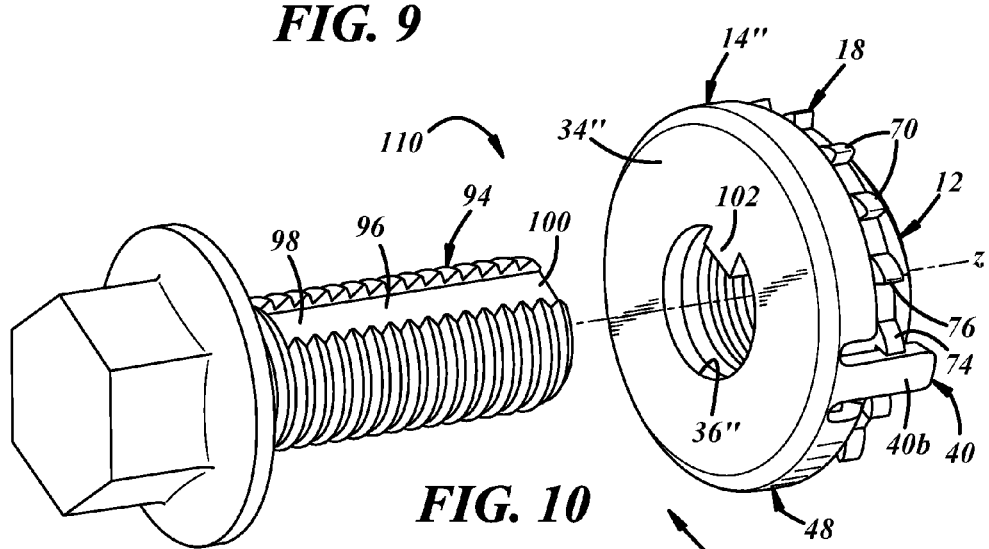
FIG. 10 is a partially exploded perspective view of a threaded bolt and a fastener assembly according to a third illustrative embodiment, the fastener assembly including a washer having a key and the threaded bolt having a longitudinally extending keyway adapted to receive the key.
Figure 11:
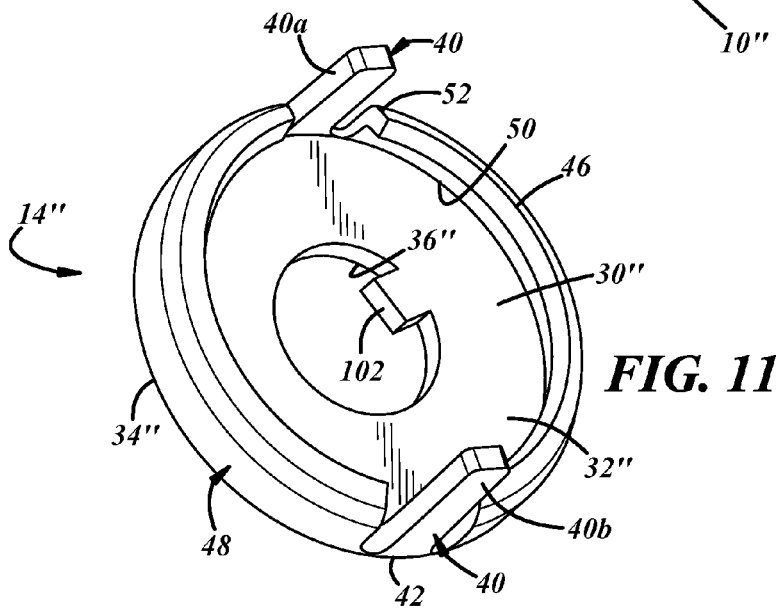
FIG. 11 is a perspective view of the washer shown in FIG. 10.

FIGS. 10-11 illustrate a third illustrative embodiment of a fastener assembly 10" that includes a key and keyway. The fastener 12 may be an internally threaded nut, and the fastener assembly 10" may further include an externally threaded shank 94 threaded to the nut 12. The shank 94 may include a keyway 96 extending longitudinally from an end 98 of the shank 94 toward an opposite end 100 of the shank 94. Likewise, a washer 14" also may include a key 102 extending from the washer base 30" into the washer aperture 36" and (when assembled) into the keyway 96 of the shank 94. The shank 94 may be that of a bolt, a stud such as an automotive ball stud, or any other suitable component. The combination of the key 102 and keyway 96 coupling and the pawl 40 and ratchet plate 18 coupling provides a complete locking circuit 110 to prevent loosening of the fastener assembly 10".

The art of fastener assemblies is an old and crowded one, but subtle improvements in fastener assemblies continue to be very useful, particularly where they decrease complexity of manufacturing and/or increase quality/reliability of products. Here, the presently disclosed fastener assembly may be easier to make and/or higher in quality/reliability than many current designs.

As used in the sections above and claims below, the terms "for example," "for instance," and "such as," and the verbs "comprising," "having," "including," and their other verb forms, when used in conjunction with a listing of one or more components or other items, are each to be construed as open-ended, meaning that the listing is not to be considered as excluding other, additional components, elements, or items. Similarly, when introducing elements of the invention or the example embodiments thereof, the articles "a," "an," "the," and "said" are intended to mean that there are one or more of the elements. Moreover, directional words such as front, rear, top, bottom, upper, lower, radial, circumferential, axial, lateral, longitudinal, vertical, horizontal, transverse, and/or the like are employed by way of description and not limitation. Other terms are to be construed using their broadest reasonable meaning unless they are used in a context that requires a different interpretation.

Finally, the foregoing description is not a definition of the invention, but is a description of one or more examples of illustrative embodiments of the invention. The statements contained in the foregoing description relate to the particular examples and are not to be construed as limitations on the scope of the invention as claimed below or on the definition of terminology used in the claims, except where terminology is expressly defined above. And although the present invention has been disclosed using a limited number of examples, many other examples are possible and it is not intended herein to mention all of the possible manifestations of the invention. In fact, other modifications, variations, forms, ramifications, substitutions, and/or equivalents will become apparent to those skilled in the art in view of the foregoing description. The present invention is intended to embrace such forms, ramifications, modifications, variations, substitutions, and/or equivalents as fall within the spirit and broad scope of the following claims. In other words, the present invention encompasses many substitutions or equivalents of limitations recited in the following claims. For example, the materials, sizes, and shapes, described above could be readily modified or substituted with other similar materials, sizes, shapes, and/or the like. Therefore, the invention is not limited to the particular examples of illustrative embodiments disclosed herein, but instead is defined solely by the claims below.

The invention claimed is:

1. A fastener assembly extending along a longitudinal axis, and comprising:
   a fastener rotatable about the axis, and including:
      a fastener head with side flats, and
      a washer bearing surface extending transversely with respect to the axis;
   a washer rotatable with respect to the fastener head, and including:
      a washer base having a first bearing surface disposed transversely with respect to the axis and in direct contact with the washer bearing surface of the fastener, a second bearing surface facing in an opposite direction from the first bearing surface, and an aperture extending completely through the washer base between the first and second bearing surfaces,
      a rim extending in a circumferential direction around a circumferential periphery of the washer base and in an axial direction from the washer base toward the fastener head, wherein the rim of the washer is circular and does not circumferentially lock to the fastener or the ratchet, and
      at least one pawl extending from the washer base in a direction toward the fastener head and at least partially alongside the fastener head, and being resiliently flexible in a radially outward direction; and
   a ratchet plate carried by the fastener head and non-rotatable with respect to the fastener head, and including:
      a ratchet base,
      an inner profile receiving the head of the fastener, and having inner flats corresponding to the side flats of the fastener head, and
      a ratcheted outer profile extending in a circumferential direction around a circumferential periphery of the ratchet base for cooperation with the pawl of the washer.

2. The assembly of claim 1, wherein the washer is a captive washer carried by the fastener head, and axially restrained with respect to the fastener head, and also including the rim extending at least partially alongside the fastener head and bent over a portion of the fastener head, and wherein the at least one pawl circumferentially interrupts the rim, and is longitudinally longer than the rim.

3. The assembly of claim 1, wherein the pawl cooperates with the ratchet plate to allow the fastener to freewheel with respect to the washer in a tightening rotational direction of the fastener but to lock with respect to the washer in a loosening rotational direction of the fastener.

4. The assembly of claim 1, wherein tightening rotation of the fastener and ratchet results in relative rotational movement between the ratchet plate and the pawl such that the ratcheted circumferential periphery of the ratchet radially outwardly deflects the pawl.

5. The assembly of claim 1, wherein the fastener includes a nut or a bolt.

6. The assembly of claim 1, wherein the washer includes a bend between the washer base and the pawl, and wherein the pawl otherwise includes no other bends.

7. The assembly of claim 1, wherein the washer includes a bend between the washer base and the rim, and wherein the rim includes another bend.

8. The assembly of claim 1, wherein the at least one pawl includes two diametrically opposed pawls and the ratcheted external periphery includes at least four teeth.

9. The assembly of claim 1, wherein the ratcheted external periphery is flat.

10. The assembly of claim 1, wherein the ratchet base is in direct contact with the rim of the washer.

11. The assembly of claim 1, wherein the ratcheted external periphery has a round circumferentially extending portion and a plurality of teeth extending therefrom.

12. The assembly of claim 11, wherein the teeth have asymmetrical profiles including cam surfaces facing in a tightening rotational direction and stop shoulders facing in a loosening rotational direction.

13. The assembly of claim 1, wherein the pawl extends longitudinally past the ratchet base and further alongside the fastener head.

14. The assembly of claim 13, wherein the longitudinally extending pawl is radially outwardly displaceable out of engagement with the ratchet plate by a socket head tool that couples to fastener head.

15. The assembly of claim 1, wherein the second bearing surface of the washer includes a plurality of protuberances extending longitudinally therefrom.

16. The assembly of claim 15, wherein the protuberances are D-shaped when viewed along the longitudinal axis, including semicircular sides facing in a tightening rotational direction and smoothly blending into the second bearing surface, and straight sides facing in a loosening rotational direction and abruptly projecting from the second bearing surface.

17. The assembly of claim 1, wherein the washer also includes a key extending from the washer base into the washer aperture.

18. The assembly of claim 1, wherein the fastener includes an internally threaded nut.

19. The assembly of 18, further comprising an externally threaded shank threaded to the nut and including a keyway, and wherein the washer also includes a key extending from the washer base into the washer aperture and into the keyway of the shank.

20. A fastener assembly extending along a longitudinal axis, and comprising:
   a fastener rotatable about the axis, and including:
      a fastener head with side flats, and
      a washer bearing surface extending transversely with respect to the axis;
   a washer rotatable with respect to the fastener head, and including:
      a washer base having a first bearing surface disposed transversely with respect to the axis and in direct contact with the washer bearing surface of the fastener, a second bearing surface facing in an opposite direction from the first bearing surface, and an aperture extending completely through the washer base between the first and second bearing surfaces, and
      at least one pawl extending from the washer base in a direction toward the fastener head and at least partially alongside the fastener head, and being resiliently flexible in a radially outward direction; and
   a ratchet plate carried by the fastener head and non-rotatable with respect to the fastener head, and including:
      a ratchet base,
      an inner profile receiving the head of the fastener, and having inner flats corresponding to the side flats of the fastener head, and
      a ratcheted outer profile extending in a circumferential direction around a circumferential periphery of the ratchet base for cooperation with the pawl of the washer,
   wherein the fastener head is a flanged fastener including a flange disposed between the side flats and the washer.

21. A fastener assembly extending along a longitudinal axis, and comprising:
   a fastener rotatable about the axis, and including:
      a fastener head with side flats, and
      a washer bearing surface extending transversely with respect to the axis;
   a washer rotatable with respect to the fastener head, and including:
      a washer base having a first bearing surface disposed transversely with respect to the axis and in direct contact with the washer bearing surface of the fastener, a second bearing surface facing in an opposite direction from the first bearing surface, and an aperture extending completely through the washer base between the first and second bearing surfaces, and
      at least one pawl extending from the washer base in a direction toward the fastener head and at least partially alongside the fastener head, and being resiliently flexible in a radially outward direction; and
   a ratchet plate carried by the fastener head and non-rotatable with respect to the fastener head, and including:
      a ratchet base,
      an inner profile receiving the head of the fastener, and having inner flats corresponding to the side flats of the fastener head, and
      a ratcheted outer profile extending in a circumferential direction around a circumferential periphery of the ratchet base for cooperation with the pawl of the washer,
   wherein the pawl of the washer is straight, extending only in a longitudinal direction, and not bent into compound planes.

22. A fastener assembly extending along a longitudinal axis, and comprising:
   a fastener rotatable about the axis, and including:
      a fastener head with side flats, and
      a washer bearing surface extending transversely with respect to the axis;
   a washer rotatable with respect to the fastener head, and including:
      a washer base having a first bearing surface disposed transversely with respect to the axis and in direct contact with the washer bearing surface of the fastener, a second bearing surface facing in an opposite direction from the first bearing surface, and an aperture extending completely through the washer base between the first and second bearing surfaces, and
      at least one pawl extending from the washer base in a direction toward the fastener head and at least partially alongside the fastener head, and being resiliently flexible in a radially outward direction; and
   a ratchet plate carried by the fastener head and non-rotatable with respect to the fastener head, and including:
      a ratchet base,
      an inner profile receiving the head of the fastener, and having inner flats corresponding to the side flats of the fastener head, and
      a ratcheted outer profile extending in a circumferential direction around a circumferential periphery of the ratchet base for cooperation with the pawl of the washer,
   wherein the fastener is staked to the ratchet plate.

23. A fastener assembly extending along a longitudinal axis, and comprising:
   a fastener rotatable about the axis, and including:
      a fastener head with side flats, and
      a washer bearing surface extending transversely with respect to the axis;
   a captive washer carried by the fastener head, rotatable with respect to the fastener head, axially restrained with respect to the fastener head, and including:
      a washer base having a first bearing surface disposed transversely with respect to the axis and in direct contact with the washer bearing surface of the fastener, a second bearing surface facing in an opposite direction from the first bearing surface, and an aperture extending completely through the washer base between the first and second bearing surfaces,
      a rim extending in a circumferential direction around a circumferential periphery of the washer base and in an axial direction from the washer base toward the fastener head and at least partially alongside the fastener head and bent over a portion of the fastener head, and at least one pawl extending from the washer base in a direction toward the fastener head and at least partially alongside the fastener head, circumferentially interrupting the rim, and being resiliently flexible in a radially outward direction and longitudinally longer than the rim; and a ratchet plate carried by the fastener head and non-rotatable with respect to the fastener head, and including:

a ratchet base, an inner profile receiving the head of the fastener, and having inner flats corresponding to the side flats of the fastener head, and a ratcheted outer profile extending in a circumferential direction around a circumferential periphery of the ratchet base for cooperation with the pawl of the captive washer.

24. The assembly of claim 23, wherein the captive washer is axially restrained with respect to the fastener head, wherein the captive washer includes a rim extending in a circumferential direction around a circumferential periphery of the washer base and in an axial direction from the washer base toward the fastener head and at least partially alongside the fastener head and bent over a portion of the fastener head, and wherein the at least one pawl circumferentially interrupts the rim, and is longitudinally longer than the rim.

25. The assembly of claim 23, wherein the pawl cooperates with the ratchet plate to allow the fastener to freewheel with respect to the captive washer in a tightening rotational direction of the fastener but to lock with respect to the captive washer in a loosening rotational direction of the fastener, and wherein tightening rotation of the fastener and ratchet results in relative rotational movement between the ratchet plate and the pawl such that the ratcheted circumferential periphery of the ratchet radially outwardly deflects the pawl.

26. The assembly of claim 23, wherein the fastener includes a nut or a bolt, the fastener head is a flanged fastener including a flange disposed between the side flats and the captive washer, the pawl of the captive washer is straight, extending only in a longitudinal direction, and not bent into compound planes the captive washer includes a bend between the washer base and the pawl, the rim of the captive washer is circular and does not circumferentially lock to the fastener or the ratchet, the at least one pawl includes two diametrically opposed pawls and the ratcheted external periphery includes at least four teeth, the ratcheted external periphery is flat, the ratchet base is in direct contact with the rim of the captive washer, the ratcheted external periphery has a round circumferentially extending portion and a plurality of teeth extending therefrom, the teeth have asymmetrical profiles including cam surfaces facing in a tightening rotational direction and stop shoulders facing in a loosening rotational direction, the pawl extends longitudinally past the ratchet base and further alongside the fastener head.

* * * * *